(12) United States Patent
Dickakian et al.

(10) Patent No.: US 7,329,635 B2
(45) Date of Patent: Feb. 12, 2008

(54) CRUDE OIL COMPOSITION INCLUDING DISPERSANT MATERIAL FOR MITIGATING FOULING OF PROCESS EQUIPMENT AND METHOD FOR MITIGATING CRUDE OIL FOULING

(75) Inventors: Ghazi B. Dickakian, Kingwood, TX (US); C. Edward Baxter, Jr., League City, TX (US); Jeffrey Quoc Truong, Houston, TX (US)

(73) Assignee: Texas Petrochemicals LP, Houston, TX (US)

(*) Notice: Subject to any disclaimer, the term of this patent is extended or adjusted under 35 U.S.C. 154(b) by 0 days.

(21) Appl. No.: 11/634,668

(22) Filed: Dec. 6, 2006

(65) Prior Publication Data

US 2007/0100082 A1 May 3, 2007

Related U.S. Application Data

(62) Division of application No. 10/850,537, filed on May 20, 2004, now abandoned.

(51) Int. Cl.
*C10M 145/16* (2006.01)

(52) U.S. Cl. .............. 508/466; 508/468; 525/326.7

(58) Field of Classification Search ............ 525/326.7; 508/466, 468
See application file for complete search history.

(56) References Cited

U.S. PATENT DOCUMENTS

| | | | |
|---|---|---|---|
| 3,172,892 A | 3/1965 | Le Suer et al. | |
| RE26,330 E | 1/1968 | Colfer | |
| 3,804,763 A | 4/1974 | Meinhardt | |
| 4,152,499 A | 5/1979 | Boerzel et al. | |
| 4,195,976 A | 4/1980 | Ryer et al. | |
| 4,605,808 A | 8/1986 | Samson | |
| 4,618,411 A | 10/1986 | Dickakian | |
| 4,619,756 A | 10/1986 | Dickakian | |
| 4,849,572 A | 7/1989 | Chen et al. | |
| 4,931,164 A | 6/1990 | Dickakian | |
| 5,110,997 A | 5/1992 | Dickakian | |
| 5,132,225 A | 7/1992 | Dickakian | |
| 5,312,554 A | 5/1994 | Waddoups et al. | |
| 5,451,333 A | 9/1995 | Waddoups et al. | |
| 5,756,428 A * | 5/1998 | Emert et al. ............... | 508/192 |
| 5,788,722 A | 8/1998 | Emert et al. | |
| 5,883,196 A * | 3/1999 | Rath et al. ............... | 525/285 |
| 6,051,537 A | 4/2000 | Emert et al. | |
| 6,127,321 A | 10/2000 | Emert et al. | |
| 6,355,074 B1 | 3/2002 | Emert et al. | |
| 6,355,603 B1 * | 3/2002 | Rath et al. ............... | 508/232 |

FOREIGN PATENT DOCUMENTS

EP 0355895 2/1990

OTHER PUBLICATIONS

Product Information Sheet, Heavy Polyamine X, The Dow Chemical Company, Midland, Michigan, Published Oct. 2001.
G. Dickakian and S. Seay, Asphaltenes Precipitation Primary Crude Exchanger Fouling Mechanism, Oil and Gas Journal, Mar. 7, 1988.

* cited by examiner

*Primary Examiner*—Bernard Lipman
(74) *Attorney, Agent, or Firm*—Stinson Morrison Hecker LLP; James H. Marsh, Jr.

(57) ABSTRACT

A crude oil composition wherein fouling has been mitigating and a method for mitigating crude oil fouling. The composition includes crude oil and an improved dispersant material for mitigating fouling which comprises a reaction product of a polyamine and a polyisobutylene succinyl anhydride made with a polyisobutylene having a vinylidene double bond content of at least 50%. The reaction product has an active nitrogen atom content of at least about 2% by weight. The reaction product is prepared by thermally reacting the polyisobutylene with maleic anhydride to produce said polyisobutylene succinyl anhydride and thereafter reacting the polyisobutylene succinyl anhydride with a polyamine having 5 to 7 active nitrogen atoms. The method includes providing the dispersant material and dispersing the same in crude oil.

18 Claims, No Drawings

CRUDE OIL COMPOSITION INCLUDING DISPERSANT MATERIAL FOR MITIGATING FOULING OF PROCESS EQUIPMENT AND METHOD FOR MITIGATING CRUDE OIL FOULING

CROSS REFERENCE TO RELATED APPLICATIONS

This application is a divisional of and claims priority pursuant to 35 U.S.C. § 120 from co-pending application Ser. No. 10/850,537, filed May 20, 2004 now abandoned. The entirety of the disclosure of said prior application Ser. No. 10/850,537 is hereby specifically incorporated herein by this specific reference thereto.

BACKGROUND OF THE INVENTION

1. Field of the Invention

The present invention relates to dispersant materials useful for mitigating and/or inhibiting fouling of equipment used for handling and/or treating liquid hydrocarbons such as crude oil and the like, and particularly to improved antifoulant materials based on a reaction product of a hydrocarbon long chain such as polyisobutylene (PIB), a bridging agent such as maleic anhydride and a substance having a polar group such as a polyamine (PAM). Such products are sometimes referred to generically as PIBSA-PAMs. The invention also relates to methodology useful for mitigating the fouling tendencies of crude oils and the like which includes the addition of an improved fouling mitigating and/or inhibiting dispersant material thereto. Furthermore, the invention relates to improved crude oil compositions wherein fouling tendencies have been mitigated by the presence therein of improved fouling mitigating and/or inhibiting dispersant materials.

2. Background of the Invention

Crude oil is complex mixture composed of many components which vary greatly in their chemical and physical properties. The basic components of crude oils include saturated hydrocarbons, naphthenes, resins, aromatics and macromolecular asphaltenes. Crude oils are classified as naphthinic, aromatic or paraffinic, depending upon the relative concentrations of these ingredients. Asphaltenes are present in most crude oils; however, the concentration thereof may vary from about 0.1 wt % to as much as 12 wt %, depending on the origin of the crude. Asphaltenes are highly aromatic conglomerates with very high molecular weights, and the same may generally be characterized as alkyl aromatics consisting of polycondensed aromatics of six or more rings. Asphaltenes are at least partially soluble in aromatics. However, the same are generally insoluble in saturated hydrocarbons, and, as a result, asphaltenes usually exist in crude oils in the form of a suspension that is stabilized by the resin fraction which acts as a natural dispersant.

As is well known in the petrochemical industry, in order to beneficiate crude oils and produce valuable commercial products therefrom, it is generally necessary to subject the crude oil materials to distillation and/or cracking operations, or the like, wherein the crude oil materials are subjected to high temperatures. However, when crude oils, and particularly those that are deficient in aromatics and/or resins, are subjected to the high temperatures needed for processing, the asphaltenes and other undesirable carbonaceous materials become incompatible with the liquid phase and tend to flocculate and/or precipitate so as to deposit and accumulate on hot metal internal surfaces of processing equipment. This accumulation of undesirable carbonaceous materials on the internal surfaces of process equipment is often referred to as "fouling." And fouling often causes serious operational problems such as reduced heat transfer efficiency and increased pressure drop characteristics. In fact, in some cases fouling is of sufficient magnitude to totally block flow through the equipment. Moreover, fouling often may be the cause of increased metal corrosion.

Needless to say, the fouling of process equipment such as heat exchangers and/or furnace tubes, for example, is a costly problem in refineries and petrochemical plants and the like, since the fouled equipment must be dismantled, cleaned and reassembled. Such cleaning operations are not only tedious and costly, but result in a large amount of "downtime" during which the units are not functioning.

It is known that certain dispersants of specific chemical structure can mitigate and/or inhibit fouling of process equipment by crude oils and the like. Such dispersants generally function to disperse and suspend in the liquid phase undesirable carbonaceous materials such as asphaltene macromolecules that form during heating of the crude oil. Thus, these dispersants inhibit and/or prevent the accumulation of undesirable carbonaceous materials on the internal surfaces of the equipment. Generally speaking, these known dispersants have polar atoms which may function to chelate with the undesirable carbonaceous materials to thereby assist in the dispersion of the same in the liquid phase. Accordingly, the undesirable carbonaceous materials are kept in suspension and not allowed to flocculate out for accumulation on the internal surfaces of the process equipment.

Known dispersants for mitigating fouling during processing of crude oils and the like often include a long chain hydrocarbon portion to provide solubility of the dispersant in oil and a polar functionality group providing an active site capable of chelation with undesirable carbonaceous materials such as asphaltene macromolecules, whereby the latter are kept in a suspended, dispersed condition in the crude oil. These polar functionality groups often include oxygen and/or nitrogen atoms which facilitate efficient chelation and the resultant dispersion of the asphaltene. Known dispersants may also desirably have low viscosity and good thermal stability to appropriately withstand the hostile environment in which the same are utilized.

Polyisobutylene succinyl anhydride-polyamine compounds, which are often referred to as PIBSA-PAM compounds, are well known and have been used for many years as dispersants, both for dispersing oxygenated sludge in automotive engines and mitigating fouling during crude oil processing operations. The commercially available PIBSA-PAM compounds generally have a number average molecular weight ($M_N$) within the range of from about 500 to about 2000, a nitrogen atom content within the range of from about 1.0 to about 4.0 weight % and a total base number within the range of from about 40 to about 60 mg KOH per gram of PIBSA-PAM compound. In the past, these commercially used PIBSA-PAM compounds have been made by reacting a conventional PIB with maleic anhydride or the like using a chlorine facilitated process to produce a polyisobutylene succinyl anhydride (PIBSA). That is to say, the known PIBSA-PAM compounds are generally produced by first reacting a conventional PIB with maleic anhydride at elevated temperatures in the presence of chlorine gas. The PIBSA so produced is then condensed with a polyamine (PAM) having a plurality of polar nitrogen atoms.

The production of PIBSA using conventional PIB takes place as follows:

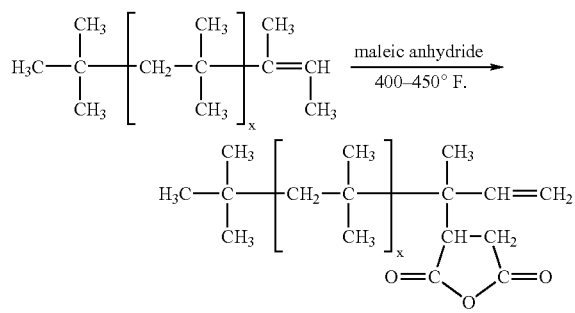

Conventional PIB products are generally produced using an AlCl$_3$ catalyst, and about 65% of the molecules of the polymeric product have double bonds that are 1,2,2-trisubstituted. The remainder of the molecules of the polymeric product have double bonds that are highly substituted, internal, and relatively non-reactive. The 1,2,2-trisubstituted double bonds are somewhat reactive in a thermal, chlorine facilitated reaction with maleic anhydride, whereas the highly substituted internal double bonds are essentially non-reactive with maleic anhydride. The PIBSA products are generally of low quality with high color and considerable char. Active PIBSA yields are generally less than 70%. Moreover, when reacting conventional PIB with maleic anhydride using a conventional "ene" reaction mechanism, it is possible to attach only one maleic anhydride group to each PIB molecule. This limits the number of polar nitrogen atoms that can be incorporated into each molecule of a conventional PIBSA-PAM dispersant. As a consequence of these things, the efficiency of the conventional dispersants for purposes of inhibiting and/or mitigating fouling is limited. Methodology for producing PIBSA-PAM products where the PIBSA is prepared by reacting conventional PIB with maleic anhydride in the presence of chlorine is described in U.S. reissue Pat. No. Re. 26,330 (the "'330 reissue patent").

More recently, processes have been developed for producing what has become known as highly reactive polyisobutylene (HR-PIB). In HR-PIB, a predominant portion of the molecules of the polymeric product have double bonds which are in a vinylidene terminal (alpha) position. Generally speaking, in commercial grades of HR-PIB, about 83 to 85% of the double bonds are in a vinylidene position. These vinylidene double bonds react readily with maleic anhydride under thermal reaction conditions to produce PIBSA products, and in general, PIBSA yields are 10 to 15% greater than when conventional PIB is utilized. Methodology for preparing PIBSA using HR-PIB as a reactant is described in European patent application no. 0 355 895 (EP '895), which also discusses the use of such PIBSA to make PIBSA-PAM. However, EP '895 does not discuss the use of the PIBSA-PAM as a dispersant for inhibiting or mitigating fouling of process equipment used for processing crude oils or the like. Moreover, the nitrogen content of the PIBSA-PAM described in EP '895 is quite low and in each case is far less than 2%.

SUMMARY OF THE INVENTION

A principal object of the invention is to provide an improved dispersant material for inhibiting and/or mitigating crude oil fouling of process equipment. In particular it is an object of the invention to provide an improved dispersant having a chemical makeup which facilitates the incorporation therein of an increased number of polar sites capable of chelating with undesirable carbonaceous materials contained in crude oils and the like. Furthermore, it is an object of the invention to provide an improved high quality PIBSA-PAM material which is produced from a clean, high quality PIBSA made using a PIB having a significant concentration of vinylidene double bonds. In the sense of the invention, a clean PIBSA is one which is relatively clear, has a light color and contains essentially no char or chlorine.

The problems inherent in the prior art are minimized, if not eliminated completely, and the foregoing objects are achieved, as a result of the present invention which provides a PIBSA-PAM dispersant material for mitigating crude oil fouling in chemical process equipment comprising a reaction product of a polyamine and a polyisobutylene succinyl anhydride made with a polyisobutylene having a vinylidene double bond content of at least 50%. Desirably the reaction product has an active nitrogen atom content of at least about 2% by weight. In accordance with the concepts and principles of the invention, the dispersant material may advantageously be prepared by thermally reacting the polyisobutylene with maleic anhydride to produce polyisobutylene succinyl anhydride. The polyisobutylene succinyl anhydride may thereafter desirably be reacted with a polyamine having 5 to 7 nitrogen atoms to produce PIBSA-PAM. In further accordance with the invention, the reaction product may have an $M_N$ which desirably ranges from about 400 to about 5000, and preferably ranges from about 500 to 2500. In further accordance with the invention, the active nitrogen atom content of the dispersant may desirably be in the range of from about 2% to about 12% by weight, and may advantageously be at least about 3%, 4%, 5%, 6% or more, weight. In still further accordance with the invention, the PIBSA-PAM reaction product may beneficially be prepared by reacting the polyisobutylene succinyl anhydride with a polyamine at a molar ratio of polyisobutylene succinyl anhydride to polyamine desirably within the range of from about 1:1 to about 5:1 and preferably within the range of from about 2:1 to about 2.5:1. Ideally, the dispersant material of the invention may include one or more of a second dispersant material, an antioxidant, an antipolymerant, a metal chelating chemical, a hydrocarbon solvent and an oxygen, nitrogen, sulfur or chlorine containing solvent.

In accordance with another desirable aspect of the invention, the same provides a crude oil composition wherein fouling has been mitigated comprising crude oil and an anti-fouling amount of the improved dispersant material described above dispersed in the crude oil. In further accordance with this aspect of the invention, the crude oil composition may desirably include from about 1 ppm to about 500 ppm (wt) of said dispersant material, may preferably include from about 5 ppm to about 200 ppm (wt) of said dispersant material and ideally may include from about 10 ppm to about 150 ppm (wt) of said dispersant material.

In another important aspect, the invention provides a method for mitigating crude oil fouling of chemical process equipment which includes providing a dispersant material comprising a reaction product of a polyamine and a polyisobutylene succinyl anhydride made with a polyisobutylene having a vinylidene double bond content of at least 50%, said reaction product having an active nitrogen atom content of at least about 2% by weight; and dispersing the dispersant material in a crude oil wherein fouling properties are to be mitigated.

In another important aspect, the invention provides a dispersant material for mitigating crude oil fouling in process equipment comprising a reaction product of a polyamine and a polyisobutylene succinyl anhydride, wherein the polyIsobutylene succinyl anhydride is made by a thermal process, and the reaction product has an active nitrogen content of at least about 2% by weight. Preferably, in accord with this aspect of the invention, the polyamine has from 5 to 7 nitrogen atoms. The dispersant of this aspect of the invention preferably has an active nitrogen atom content of at least about 5% by weight and ideally has an active nitrogen atom content of at least about 6% by weight.

In accordance with yet another aspect of the invention, a crude oil composition is provided wherein the fouling characteristics thereof are mitigated. In accordance with this aspect of the invention, the composition comprises crude oil and an anti-fouling amount of an improved dispersant material as described above dispersed in the crude oil. In further accord with this aspect of the invention, the crude oil composition preferably comprises from about 1 ppm to about 200 ppm (wt) of the dispersant material, desirably comprises from about 5 ppm to about 100 ppm (wt) of the dispersant material and ideally comprises from about 10 ppm to about 25 ppm (wt) of the dispersant material.

In yet another important aspect, the invention provides a method for mitigating crude oil fouling comprising providing a dispersant material comprising a reaction product of a polyisobutylene succinyl anhydride and a polyamine, said polyisobutylene succinyl anhydride characterized by having been made by a thermal process, said reaction product having an active nitrogen atom content of at least about 2% by weight, desirably greater than about 4.8% by weight, preferably at least about 5% by weight, and ideally at least about 6% by weight; and dispersing said dispersant material in a crude oil wherein fouling is to be mitigated.

DETAILED DESCRIPTION OF THE PREFERRED EMBODIMENTS

As mentioned above, the present invention provides an improved dispersant material for mitigating crude oil fouling of process equipment. In particular the invention provides an improved dispersant having a chemical makeup which facilitates the incorporation therein of an increased number of polar sites capable of chelation with undesirable carbonaceous materials such as asphaltenes contained in crude oils and the like. Furthermore, the invention provides an improved high quality PIBSA-PAM antifoulant dispersant material which is produced from a clean, high quality PIBSA produced from a PIB having a significant concentration of vinylidene double bonds. In the sense of the invention, a clean PIBSA is one which is relatively clear, has a light color, and contains essentially no char or chlorine.

Valuable PIB compositions having significant concentrations of vinylidene double bonds that are highly useful in connection with the present invention are fully described in U.S. Pat. No. 6,562,913 (the "'913 patent"). Other valuable PIB compositions having utility in connection with the present invention are fully described in United States patent publication No. US 2002/0197497 A1 (the "'497 patent publication"). The entireties of the disclosures of the '913 patent and the '497 patent publication are hereby incorporated into the disclosure of the present application by this specific reference thereto. The '895 European patent application mentioned above also describes PIB compositions having significant concentrations of vinylidene double bonds that are useful in connection with the present invention.

In accordance with the concepts and principles of the present invention, the methodology used for preparing the PIB compositions useful in connection with the present invention is not critical. The only critical feature of the PIB compositions is that the same should include significant concentrations of polymeric molecules having vinylidene double bonds. Preferably, the molar concentration of molecules of having vinylidene double bonds in the overall PIB composition should be at least 50%, and desirably and ideally, this concentration may be 60%, 70%, 80%, 90% or even greater, without deviating from the overall purposes and objects of the invention. Moreover, the PIB compositions useful in accordance with the invention should preferably have an $M_N$ in the range of from about 350 to about 5000, more preferably in the range of from about 600 to about 4000, desirably in the range of from about 700 to about 3000, even more desirably in the range of from about 800 to about 2000, and ideally in the range of from about 900 to about 1050. In a highly preferred form of the invention, the PIB composition may have an $M_N$ of about 950.

Generally, and in further accordance with the concepts and principles of the invention, the PIB compositions described above may desirably be reacted with maleic anhydride to form PIBSA products. The production of PIBSA using HR-PIB and a 1:1 molar ratio or slight excess of maleic anhydride takes place according to the following reaction scheme:

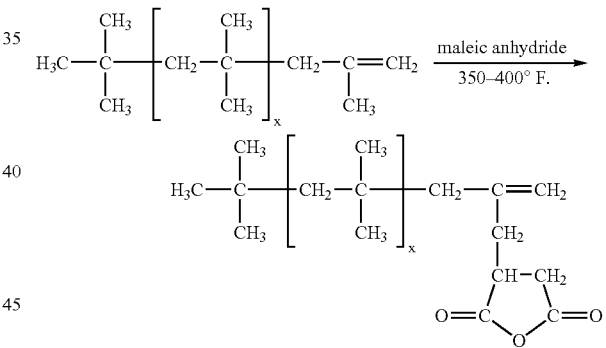

Desirably the PIBSA forming reaction follows a "thermal" route such as is described in EP '895, where the PIB and the maleic anhydride are simply mixed and heated together. Such a process minimizes the opportunity for chlorine residues to be present in the PIBSA. When PIB products that include significant concentrations of polymeric molecules having vinylidene double bonds are reacted with maleic anhydride using a "thermal" route, the maleic anhydride is used very efficiently, resulting in products of high quality which are clear, have a light color and contain essentially no char. Overall PIBSA yields are 10 to 15% greater than when conventional PIB is utilized.

When PIB products which include significant concentrations of polymeric molecules having vinylidene double bonds are reacted with a substantial excess of maleic anhydride (molar ratio of maleic anhydride to PIB of say 1.5:1 or greater), the PIBSA may be caused to include a significant concentration of a di-maleated product. That is to say, more than one molecule of maleic anhydride can be incorporated into the PIBSA product for each molecule of PIB. This facilitates the incorporation of a greater amount of polyamine into the product, whereby to increase the overall nitrogen content of the PIBSA-PAM product when the di-maleated PIBSA is reacted with a polyamine. The di-maleated PIBSA product is believed to have the following molecular configuration;

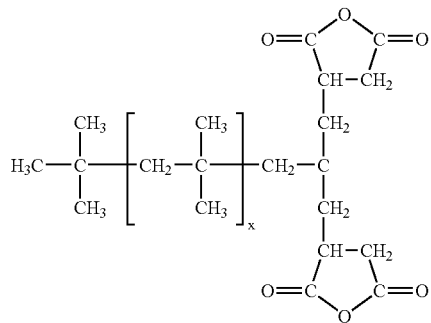

With reference to the foregoing, it has been noted in accordance with the present invention that the ability of a dispersant material to mitigate and/or inhibit crude oil fouling of process equipment may be enhanced by incorporating therein a larger number of polar sites capable of chelating with the undesirable carbonaceous materials contained in crude oils and the like. Needless to say, di-maleated PIBSA products have twice as many locations as conventional PIBSA where the same are reactive with polar nitrogen containing polyamines. Accordingly, the capacity of the PIBSA for taking on polar sites by reaction with polyamines is substantially enhanced. However, it is to be understood that in accordance with the broad aspects of the invention, it is not necessary for the PIBSA product to be di-maleated in order to achieve the benefits of the invention. Accordingly, the molar ratio of polyamine to PIB in the PIBSA of the invention may desirably range from 0.5:1 or less to as much as a theoretical value of 2:1 if the PIBSA is made from a PIB wherein 100% of the double bonds are vinylidene and each PIB molecule is di-maleated. More conveniently, the molar ratio of polyamine to PIB in the PIBSA of the invention should be in the range of from about 1:1 to about 1.5:1. With further reference to the foregoing, and in further accordance with the invention, the average number of maleic anhydride groups per molecule of PIB in the PIBSA should desirably range from about 0.5:1 to about 2:1. And ideally should range from about 1:1 to about 1.5:1.

In further accordance with the concepts and principles of the invention, the PIBSA materials discussed above are reacted with polyamines to form PIBSA-PAM substances. A great number of potentially suitable polyamine compounds are discussed in the '330 reissue patent identified above; however, the preferred amines for purposes of the present invention are the ethylene amines such as triethylenetetramine, tetraethylenepentamine and pentaethylenehexamine. A particularly valuable ethylene amine material for use in accordance with the invention is a commercially available product of Dow Chemical Company which is known as Heavy Polyamine X (HPA-X). HPA-X is a complex mixture of linear, branched, and cyclic ethyleneamines, the principal components of which include triethylenetetramine (<2.0 wt %), tetraethylenepentamine (2-25 wt %), pentaethylenehexamine (15-55 wt %) and higher molecular weight ethyleneamines (30-75 wt %). On the average, each molecule of HPA-X has 6.64 nitrogen atoms, and the same has a molecular weight of approximately 275 g/mole. Accordingly, the nitrogen content of HPA-X is about 33.8 wt %. Here also, the exact ratio of PIBSA to PAM is not critical, and the same, when expressed in terms of the molar ratio of the PAM to the maleic anhydride moieties of the PIBSA, may desirably range from about 0.5:1 to about 1:1.

It should further be noted in connection with the invention described and discussed above, that sometimes fouling resulting from crude oil processing may be caused by more than one mechanism. In such cases, it is sometimes convenient and efficient to use a combination of dispersant chemicals. That is to say, the improved PIBSA-PAM of the invention may sometimes desirably be combined with other chemical additives to provide a multi-functional additive to perform dispersing as well as other functions. Chemicals which might be used with the improved PIBSA-PAM of the invention include, without limitation, anti-oxidants such as tertiary butyl phenol, alkyl diphenyl amine, phenyl naphthyl amine and dioctyl diphenyl amine, antipolymerants such as di-tertiary-butyl cresol, tris-nonyl phenol phosphite, amino nonyl phosphite, nitroxide and di-phenyl phosphite, and metal deactivators such as disalicylidene-1,2-propane diamine.

EXAMPLE I

A preferred embodiment of an improved, high quality PIBSA-PAM material produced from a clean, high quality PIBSA made using a PIB having a significant concentration of vinylidene double bonds is prepared in the following manner:

1. 433 g of an HR-PIB product having an $M_N$ of 950 and an alpha vinylidene content of 83.6% is charged into glass reactor and the reactor is heated to 300° F. for 1 hour while a vacuum and $N_2$ sweep are applied thereto.

2. 67.04 g of Maleic Anhydride at 300° F. is added to the HR-PIB in the reactor and the reaction mixture is heated to 450° F.

3. The reaction mixture is maintained at a reaction temperature of 450° F. for 4.5 hours and thereafter a vacuum and $N_2$ sweep are applied to the reactor for 1 hour to strip away any unreacted Maleic Anhydride.

4. The product is a Polyisobutylene Succinic Anhydride (PIBSA).

5. 309.3 g of the PIBSA thus prepared is transferred to another glass reactor and heated to 250° F.

6. 109.3 g of Heavy Polyamine X at 240° F. is added over a period of 1 hour to the reactor containing the PIBSA while the reaction temperature is maintained between 240° F. and 270° F.

7. The reaction temperature is then increased to 280° F. and held at that level for 1 hour and 20 minutes.

8. The reaction temperature is then increased to 305° F. and held at that level for 3 hours and 20 minutes.

9. A vacuum and $N_2$ sweep are applied to the reactor for 1 hour to strip the polyisobutylene succinimide (PIBSA-PAM) product of residual reactants, etc.

10. The final product is analyzed and determined to have a nitrogen content of 8.9 weight percent %.

A commercially available PIBSA-PAM product made from conventional PIB and having a $M_N$ of about 1300 was acquired for comparison purposes. This material and the improved PIBSA-PAM prepared in accordance with Example I were subjected to identical testing to determine the ability of each material to inhibit and/or mitigate fouling in a chemical process type environment. A Thermal Fouling Test Method (TFTM) was used for this purpose. The TFTM is an accelerated test method that is designed to reproduce the fouling problems experienced in refinery processes or petrochemical plants. The test temperatures are generally higher than those actually encountered in a commercial operation so that similar problems may be reproduced in a shorter, more reasonable period of time. The TFTM is not an exact simulation of refinery heat exchanger fouling, but by accelerating fouling through high fluid temperature, it provides a valuable tool that yields results in a reasonable time. The TFTM has been shown to correlate well with plant results and is, therefore, useful for research, investigating fouling, and developing antifoulants. The test is described in the literature. Wachel, L. J., "Exchanger Simulator: Guide to Less Fouling," Hydrocarbon Processing, November 1986, pp. 107-110.

In summary, the TFTM involves the use of a thermal fouling tester (TFT) which measures crude oil fouling. In the TFT, a crude oil sample is circulated through a miniature heat exchanger with a carbon steel heater tube. The entire TFT system is pressurized to prevent vaporization of the sample at the high temperatures in the exchanger. Fouling is determined by measuring the fluid outlet temperature which varies as a function of deposit formation on the heater metal surface. A greater temperature degradation indicates a higher degree of fouling.

The TFTM is an excellent method for simulating the fouling which might occur in processing equipment as a result of the processing of crude oils and the like and for measuring the efficiency of antifoulant materials. The effect of antifoulant materials for crude oil treatment is described below.

EXAMPLE II

Thermal Fouling Testing of Untreated Crude Oil

The thermal fouling characteristics of untreated crude oil is determined using the TFTM described above. The thermal fouling test results show that the crude oil used in connection with these tests is a relatively high fouling crude oil. Test conditions and test fouling results are presented below.

| | |
|---|---|
| Exchanger heater metal temperature | 700° F. |
| Liquid outlet temperature | 510° F. |
| Unit operating pressure | 800 psig |
| Exchanger heater metal type | C/S 1018 |
| Oil flow | 3.0 cc/min |
| Test time | 180 minutes |
| Measured fouling | 70° F. |

EXAMPLE III

Thermal Fouling Testing of Crude Oil Containing Conventional PIBSA-PAM Antifouling Agent A crude oil identical to the crude oil tested in Example I was blended with 100 ppm (wt) of the acquired PIBSA-PAM that was made with conventional PIB. This conventional commercially available PIBSA-PAM had the following characteristics:

| | |
|---|---|
| Average molecular weight ($M_N$) | 1300 |
| Carbon content | 82.87 wt % |
| Hydrogen content | 12.89 wt % |
| Oxygen content | 0.90 wt % |
| Nitrogen content | 4.8 wt % |
| Carbon/Hydrogen atomic ratio | 0.53 |
| Total base number | 114 mg/gm |

The TFTM was used to determine the thermal fouling of the treated crude oil using exactly the same operating conditions as used in Example II. Test results show that the crude oil treated with conventional PIBSA-PAM has reduced fouling characteristics as compared with the untreated crude oil. Test operating conditions and results are presented below.

| | |
|---|---|
| Exchanger heater metal temperature | 700° F. |
| Liquid outlet temperature | 514° F. |
| Unit operating pressure | 800 psig |
| Exchanger heater metal type | C/S 1018 |
| Oil flow | 3.0 cc/min |
| Test time | 180 minutes |
| Measured fouling | 46° F. |

EXAMPLE IV

Thermal Fouling Testing of Crude Oil Containing a PIBSA-PAM Antifouling Agent Prepared from Improved PIBSA-PAM A crude oil identical to the crude oil tested in Example I was blended with 100 ppm (wt) of the PIBSA-PAM made in accordance with Example I. This improved PIBSA-PAM had the following characteristics:

| | |
|---|---|
| Average molecular weight ($M_N$) | 1300 |
| Nitrogen content | 8.9 wt % |
| Total base number | 132 mg/gm |

The TFTM was used to determine the thermal fouling of the treated crude oil using exactly the same operating conditions as used in Examples II and III. The test results set forth below show that the crude oil treated with the PIBSA-PAM of the invention that is made from a PIB having a significant content of vinylidene double bonds, has reduced fouling characteristics as compared with either the untreated crude oil or the crude oil treated with conventional PIBSA-PAM. Test operating conditions and results are presented below.

| | |
|---|---|
| Exchanger heater metal temperature | 700° F. |
| Liquid outlet temperature | 507° F. |
| Unit operating pressure | 800 psig |
| Exchanger heater metal type | C/S 1018 |
| Oil flow | 3.0 cc/min |
| Test time | 180 minutes |
| Measured fouling | 30° F. |

We claim:
1. A crude oil composition wherein fouling has been mitigated comprising crude oil and an anti-fouling amount of a dispersant material dispersed in said crude oil, said dispersant material comprising a reaction product of a polyamine and a polyisobutylene succinyl anhydride made with a polyisobutylene having a vinylidene double bond content of at least 50%, said reaction product having an active nitrogen atom content of at least about 2% by weight.

2. A crude oil composition as set forth in claim 1, comprising from about 1 ppm to about 500 ppm of said dispersant material.

3. A crude oil composition as set forth in claim 1, comprising from about 5 ppm to about 200 ppm of said dispersant material.

4. A crude oil composition as set forth in claim 1, comprising from about 10 ppm to about 150 ppm of said dispersant material.

5. A method for mitigating crude oil fouling comprising:
providing a dispersant material comprising a reaction product of a polyamine and a polyisobutylene succinyl anhydride made with a polyisobutylene having a vinylidene double bond content of at least 50%, said reaction product having an active nitrogen atom content of at least about 2% by weight;
dispersing said dispersant material in crude oil wherein fouling is to be mitigated; and
subjecting said crude oil to processing in an environment conducive to the occurrence of fouling.

6. A method as set forth claim 5, wherein said reaction product is prepared by thermally reacting said polyisobutylene with maleic anhydride to present said polyisobutylene succinyl anhydride, and thereafter reacting the polyisobutylene succinyl anhydride with a polyamine having 5 to 7 nitrogen atoms.

7. A method as set forth in claim 5, wherein said reaction product has a number average molecular weight which ranges from about 400 to about 5000.

8. A method as set forth in claim 7, wherein said reaction product has a number average molecular weight which ranges from about 500 to 2500.

9. A method as set forth in claim 5, wherein said dispersant material has an active nitrogen atom content of at least about 4% by weight.

10. A method as set forth in claim 5, wherein said dispersant material has an active nitrogen atom content of at least about 6% by weight.

11. A method as set forth in claim 6, wherein said reaction product is prepared by reacting said polyisobutylene succinyl anhydride with a polyamine at a molar ratio within the range of from about 0.5:1 to about 5:1.

12. A crude oil composition wherein the tendency for fouling has been mitigated comprising crude oil and an antifouling amount of a dispersant material dispersed in said crude oil, said dispersant material comprising a reaction product of a polyisobutylene succinyl anhydride and a polyamine, wherein said polyisobutylene succinyl anhydride is characterized by having been prepared by thermally reacting a polyisobutylene with maleic anhydride, said reaction product having an active nitrogen content of at least about 2% by weight.

13. A crude oil composition as set forth in claim 12, comprising from about 1 ppm to about 500 ppm of said dispersant material.

14. A crude oil composition as set forth in claim 12, comprising from about 5 ppm to about 200 ppm of said dispersant material.

15. A crude oil composition as set forth in claim 12, comprising from about 10 ppm to about 150 ppm of said dispersant material.

16. A method for mitigating crude oil fouling comprising:
providing a dispersant material comprising a reaction product of a polyamine and a polyisobutylene succinyl anhydride made with a polyisobutylene having a vinylidene double bond content of at least 50%, said reaction product having an active nitrogen atom content of at least about 2% by weight; and
dispersing said dispersant material in a crude oil wherein fouling is to be mitigated.

17. A method for mitigating crude oil fouling as set forth in claim 16, wherein said polyisobutylene succinyl anhydride is characterized by having been made by a thermal process.

18. A method for mitigating crude oil fouling as set forth in claim 16, wherein said reaction product has an active nitrogen atom content greater than 4.8% by weight.

* * * * *

UNITED STATES PATENT AND TRADEMARK OFFICE
CERTIFICATE OF CORRECTION

| | | |
|---|---|---|
| PATENT NO. | : 7,329,635 B2 | Page 1 of 1 |
| APPLICATION NO. | : 11/634668 | |
| DATED | : February 12, 2008 | |
| INVENTOR(S) | : Dickakian et al. | |

It is certified that error appears in the above-identified patent and that said Letters Patent is hereby corrected as shown below:

Column 4,
Line 35, insert --by-- between "more," and "weight.".

Signed and Sealed this

Fourteenth Day of October, 2008

JON W. DUDAS
*Director of the United States Patent and Trademark Office*